Patented Feb. 6, 1934

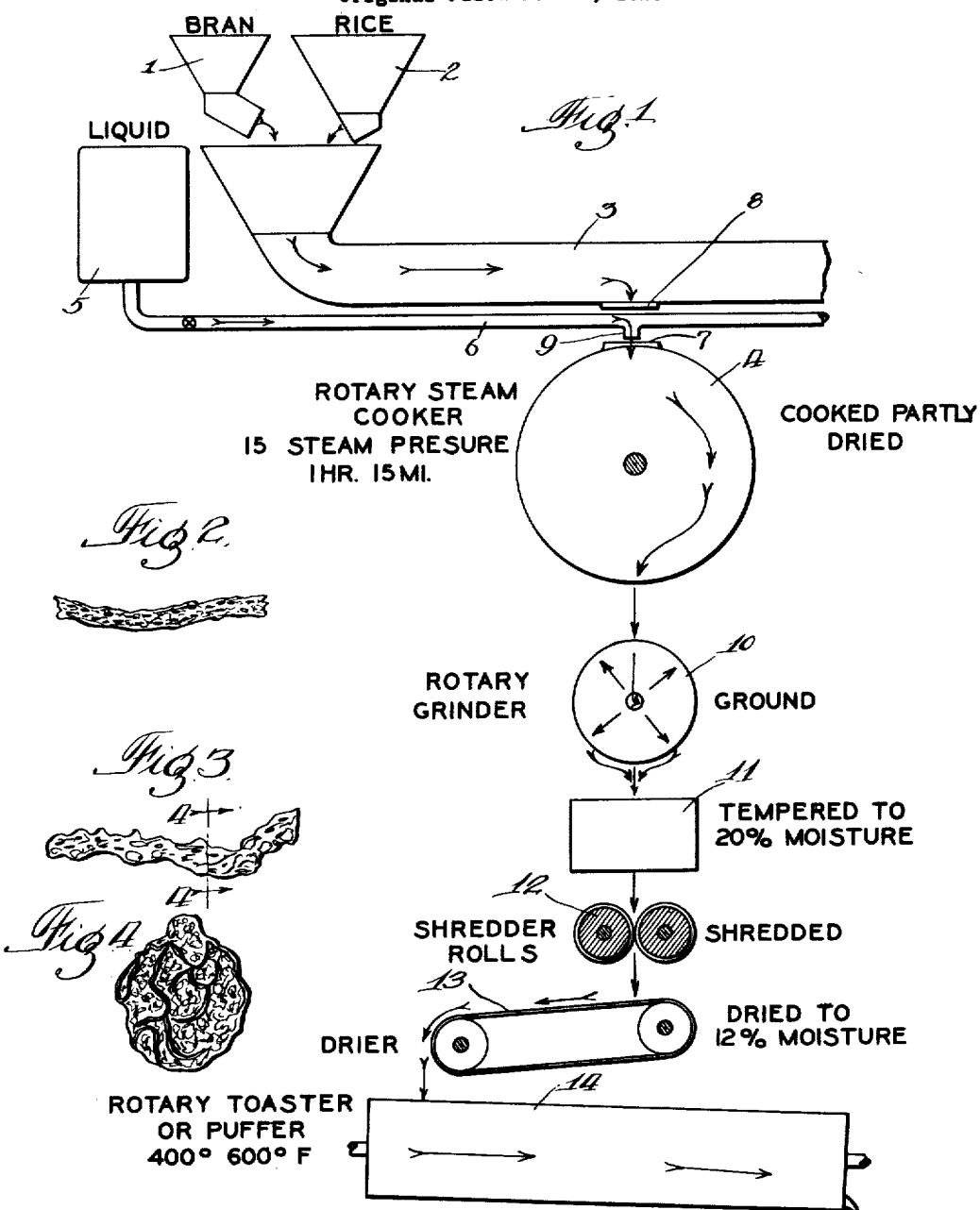

1,945,946

UNITED STATES PATENT OFFICE

1,945,946

CEREAL FOOD

Eugene H. McKay, Battle Creek, Mich., assignor to Kellogg Company, Battle Creek, Mich., a corporation of Delaware Application December 5, 1928, Serial No. 323,866
Renewed May 4, 1932

15 Claims.  (Cl. 99—10)

My invention relates to a food product and also to a method of making the same.

One of the objects of my invention is to provide a new ready-to-eat cereal food preferably in the form of crisp, puffed shreds and the like.

Another object of the invention is to provide a new method of making a ready-to-eat cereal food product.

Another of the objects of the invention is to provide a ready-to-eat cereal food having a particularly attractive flavoring due to the combination of rice with another cereal material such as bran or wheat in certain proportions.

A further object is to provide a rice food having increased mineral salts and greater laxative qualities due to the combination of bran with the rice, rice alone being deficient in fiber and mineral salts.

In the drawing—

Figure 1 shows diagrammatically various steps in the process used in making the food product;

Fig. 2 is a somewhat enlarged view showing the cooked, ground and shredded product prior to puffing;

Fig. 3 shows the final puffed product; and

Fig. 4 is a greatly enlarged sectional view of the final product substantially on the line 4—4 of Figure 3.

The cereal grain employed in carrying out the invention may be of any suitable character, such as, for example, rice. Where rice is used, however, I preferably employ therewith bran in order to increase the mineral salts and fibre contents of the final product.

I will now describe by way of example one specific method used in making one specific product, it being understood that the process may be varied as to the length of time of the various steps, the temperatures used and the moisture contents defined. Assuming for the specific example chosen that the product is to be a mixture of rice, as the major ingredient and bran, the proportions may, for example, be 800 pounds of rice to 200 pounds of bran. Those materials are supplied in the above proportions from the bran and rice supplies indicated at 1 and 2, to a conveyor 3 which may carry the material above a battery of rotary cookers (only one cooker 4 being shown). Liquid is supplied from any suitable reservoir 5 to the battery of cookers through the supply pipe 6. For the indicated amount of bran and rice I have found satisfactory results are obtained by using about 30 gallons of water containing 60 pounds of sugar, 20 pounds of salt and suitable flavoring material. The rotary cooker is stopped with its filling opening 7 in position underneath the discharge openings 8 and 9 from the conveyor and supply pipe, respectively, and the batch of bran, rice and liquid is discharged into the cooking chamber which is then closed up. The steam is then turned on, at about 15 pounds steam pressure, and the cooker is rotated slowly at first to mix the material and then more rapidly and this cooking is kept up for about one hour and fifteen minutes, the steam being then turned off and the rotation continued for a while to dry the material somewhat. The material is then discharged from the rotary cooker and is subsequently ground in a rotary attrition grinder 10, which thoroughly macerates the material so that it can thereafter be easily shaped by pressure to the desired form of particles. After being ground the material may be tempered in a tempering vat 11 to bring it to the proper consistency and moisture content for the subsequent forming operation. I have found that a moisture content of 20 percent is suitable for this purpose.

The ground and tempered material is then formed into the desired shape, as shreds, flakes, rods tubes, or other shapes, by pressure. In the present instance it is run through shredding rolls 12 which form the material into strips or shreds of substantialy the shape shown in Fig. 2. After the material is shredded, it is further dried by any suitable drier 13 to a moisture content of about 12 per cent, this further drying being necessary to give the desired puffiness friability and crispness in the final product as the result of the subsequent puffing operation. The dried shredded material, after being broken into the desired lengths in any suitable manner, is then introduced into a rotary toaster 14 having a temperature of from 400 to 600° F., the material requiring approximately 3 minutes to pass through the toaster and during its passage being puffed to substantially the form shown in Fig. 3, resulting in very light porous, crisp particles or pieces which retain their crispness in milk or cream.

The delicate crispness is the result of the novel mode of preparation employed. I have found that one of the most important steps in the process is the drying of the formed material to a moisture content of below 15 percent, or until the material is hard and brittle, just prior to the puffing operation. There is a very marked difference between the product in which this drying step is used and the product resulting when this drying step is omitted. The product in which the drying step is used is much lighter, crisper and more porous than the product resulting when this drying step is omitted.

In the previous manufacture of cereal foods it has been a common practice to attempt to secure a puffed product by adjusting the moisture content of the material prior to puffing it, somewhere between 15 and 20 percent and thereupon subjecting this material to a heat of from 400 to 600° F., thus suddenly changing the residual moisture in the material to steam which generating pressure within the cells of the food extends the cells to produce a puffed structure. I have found, however, particularly when working with rice foods, that by employing a radically different method from the above a superior type of puffing is secured, this method, as outlined above, comprising reducing the material to a plastic state, forming it to the desired shape by pressure sufficient to modify the internal structure of the cells of the food, and then reducing the moisture content of the food so as to secure a brittle product (containing approximately 5 to 14 per cent of moisture) and after this drying step subjecting the material to the puffing process by introducing it into a suitable oven or the like where a temperature of from 400 to 600° F. is maintained. The heating and puffing is continued until the puffed product has assumed a delicate brown color when it is drawn from the toaster and after cooling is ready for packing.

While I have disclosed but one specific method of making a food product of this nature, it is obvious that modifications of this method might be used without departing from the spirit of the invention, as defined in the appended claims.

In the claims where the word "bran" is used, it is to be understood as meaning the bran of any kind of cereal unless some specific cereal is specified.

I claim:

1. A process of making cereal foods comprising cooking the cereal in moisture, partially drying the cooked cereal, then grinding the same, forming the cereal to the desired shape, drying the formed material until hard and brittle and puffing the formed dried material.

2. A method of making a cereal food product comprising cooking in moisture a cereal material, grinding the cooked material, forming the ground material to the desired shape by pressure, drying the formed material until it contains from 5 to 14 percent moisture and assumes a brittle condition, and thereafter puffing the dried formed material by subjecting it to heat.

3. A method of making a cereal food product comprising cooking in moisture a cereal material, grinding the cooked material, forming the ground material to the desired shape thereafter drying the material until it contains approximately 12 percent moisture, and thereafter puffing the dried material by subjecting it to heat.

4. A process of making a ready-to-eat cereal food comprising cooking, partially drying and grinding the cereal, forming the same into continuous strips, drying the strips until the same are brittle, breaking the strips into elongated fragments and puffing the fragments.

5. A process of making a ready-to-eat cereal food comprising cooking, partially drying and grinding the cereal, forming the same into continuous strips, drying the strips until the same are brittle, breaking the strips into elongated fragments and puffing and toasting the fragments.

6. A process of making cereal foods comprising cooking rice in moisture, partially drying the cooked rice, then grinding the same, forming the rice to the desired shape, drying the formed rice until hard and brittle and puffing the formed dried rice.

7. A method of making a cereal food product comprising cooking rice in moisture, partially drying the same, grinding the partially dried rice, forming the ground rice to the desired shape, drying the formed rice until it contains about 12% moisture, and thereafter puffing the dried formed rice by subjecting it to heat.

8. A process of making a ready-to-eat cereal food comprising cooking rice in the presence of water, partially drying the cooked rice, tempering the rice until it assumes a uniform moisture content, macerating and forming the rice into continuous strips, drying the strips until they assume a brittle condition, breaking the strips into elongated fragments and puffing the fragments.

9. A process of making a ready-to-eat cereal food comprising cooking rice in the presence of a flavoring material and water, partially drying the rice, grinding the rice to small particles, tempering the same until the rice assumes a uniform moisture content, macerating and forming the rice into continuous strips, drying the strips until they assume a brittle condition, breaking the strips into elongated fragments and puffing and toasting the fragments.

10. A method of making a ready-to-eat rice and bran cereal food comprising cooking in moisture a mixture of rice and brain, partially drying the mixture, grinding the partially dried mixture, shaping the ground mixture, further drying the shaped mixture to a moisture content below 15% and until it assumes a brittle condition and then subjecting the dried brittle mixture to heat to puff the same.

11. A method of making a cereal food product comprising cooking in moisture a mixture including rice and at least the outer layers of another cereal, grinding the cooked mixture, running the ground mixture through shredding rolls to give the desired shape, drying the shredded material until it contains from 5 to 14% of moisture and is in a brittle condition, and thereafter puffing the dried shreds by subjecting them to heat.

12. A method of making a cereal food product comprising cooking in moisture a mixture including rice and other cereal material, grinding the cooked mixture, forming the ground material to the desired shape, drying the formed material until it contains from 5 to 14% moisture, and thereafter puffing the dried formed material by subjecting it to heat.

13. A method of making a cereal food product comprising cooking in moisture a mixture including rice and other cereal material, grinding the mixture, forming the cooked, ground material to the desired shape by pressure, drying the formed material until it contains from about 5 to 12% moisture, and thereafter puffing the dried formed material by subjecting it to heat.

14. A method of making a ready-to-eat cereal food comprising cooking a mixture including rice, bran and water in the proportions of about 40 pounds rice, 10 pounds bran and 1½ gallons of water at a steam pressure of about 15 pounds for about one hour fifteen minutes, drying the cooked material sufficiently to enable it to be ground properly, grinding the cooked material in an attrition grinder to a consistency suitable for shredding, drying the ground material to about a 20% moisture content, running the ground and dried material through shredding rolls, drying the shredded material to a moisture content of approximately 12% moisture, and thereafter subjecting the dried shredded material to a temperature of from 400 to 600° F. to cause the shredded material to become puffed and toasted.

15. A method of making a ready-to-eat cereal food comprising cooking a mixture of rice and at least the fibre element of another cereal in moisture, grinding the mixture, forming the cooked ground mixture into particles, drying the particles to a moisture content below 15% and until they are hard and brittle, and subjecting the particles to heat sufficiently high to puff and toast the same.

EUGENE H. McKAY.

CERTIFICATE OF CORRECTION.

Patent No. 1,945,946.   February 6, 1934.

EUGENE H. McKAY.

It is hereby certified that error appears in the printed specification of the above numbered patent requiring correction as follows: Page 1, line 81, after "rods" insert a comma; page 2, line 135, claim 12, after the syllable "ture" insert and is in a brittle condition; and that the said Letters Patent should be read with these corrections therein that the same may conform to the record of the case in the Patent Office.

Signed and sealed this 24th day of April, A. D. 1934.

Bryan M. Battey (Seal)   Acting Commissioner of Patents.

material sufficiently to enable it to be ground properly, grinding the cooked material in an attrition grinder to a consistency suitable for shredding, drying the ground material to about a 20% moisture content, running the ground and dried material through shredding rolls, drying the shredded material to a moisture content of approximately 12% moisture, and thereafter subjecting the dried shredded material to a temperature of from 400 to 600° F. to cause the shredded material to become puffed and toasted.

15. A method of making a ready-to-eat cereal food comprising cooking a mixture of rice and at least the fibre element of another cereal in moisture, grinding the mixture, forming the cooked ground mixture into particles, drying the particles to a moisture content below 15% and until they are hard and brittle, and subjecting the particles to heat sufficiently high to puff and toast the same.

EUGENE H. McKAY.

CERTIFICATE OF CORRECTION.

Patent No. 1,945,946.  February 6, 1934.

EUGENE H. McKAY.

It is hereby certified that error appears in the printed specification of the above numbered patent requiring correction as follows: Page 1, line 81, after "rods" insert a comma; page 2, line 135, claim 12, after the syllable "ture" insert and is in a brittle condition; and that the said Letters Patent should be read with these corrections therein that the same may conform to the record of the case in the Patent Office.

Signed and sealed this 24th day of April, A. D. 1934.

Bryan M. Battey (Seal)  Acting Commissioner of Patents.